United States Patent [19]

Yamashita

[11] 3,950,652

[45] Apr. 13, 1976

[54] ROLL MICROFILM RETRIEVING METHOD AND DEVICE THEREFOR

[75] Inventor: Hajime Yamashita, Tokyo, Japan

[73] Assignee: Kabushiki Kaisha Ricoh, Tokyo, Japan

[22] Filed: Mar. 20, 1974

[21] Appl. No.: 453,051

Related U.S. Application Data

[60] Continuation-in-part of Ser. No. 416,421, Nov. 16, 1973, which is a continuation of Ser. No. 133,527, April 1, 1973, which is a division of Ser. No. 777,301, Nov. 20, 1968, Pat. No. 3,594,581.

[30] Foreign Application Priority Data

Nov. 27, 1968 Japan.............................. 43-75988

[52] U.S. Cl. ................ 250/570; 353/26 A; 355/41; 352/92
[51] Int. Cl.² ........................................ G06K 7/10
[58] Field of Search .......... 353/25, 26, 120; 355/41; 352/92; 250/555, 556, 557, 570, 566, 568, 570

[56] References Cited

UNITED STATES PATENTS

| | | | |
|---|---|---|---|
| 2,482,242 | 9/1949 | Brustman | 250/570 X |
| 2,820,907 | 1/1958 | Silverman | 250/204 |
| 3,218,921 | 11/1965 | Grosvenor et al. | 353/120 X |
| 3,299,272 | 1/1967 | Furukawa et al. | 250/561 |
| 3,435,243 | 3/1969 | Webb | 250/561 |
| 3,538,313 | 11/1970 | Thomas et al. | 353/26 |
| 3,609,306 | 9/1971 | Langley | 235/61.11 E |

*Primary Examiner*—Walter Stolwein
*Attorney, Agent, or Firm*—Burgess Ryan and Wayne

[57] ABSTRACT

A roll microfilm having a plurality of consecutive frames. Each frame has a border therearound with a plurality of small sized marks located within the border and being unequally spaced apart with respect to each other for detection by a plurality of corresponding detecting elements having the same spacing.

9 Claims, 6 Drawing Figures

INVENTOR.

HAJIME YAMASHITA

ROLL MICROFILM RETRIEVING METHOD AND DEVICE THEREFOR

This application is a continuation-in-part of copending application Ser. No. 416,421, filed Nov. 16, 1973, which was a continuation of application Ser. No. 133,527 filed Apr. 1, 1973, which was a division of application Ser. No 777,301, filed Nov. 20, 1968, now U.S. Pat. No. 3,594,581.

The present invention relates to a roll microfilm of the type wherein a desired frame of the microfilm may be located by utilizing small signal marks disposed in the margins of each frame of the microfilm.

Roll microfilm retrieving devices have been provided wherein a desired frame is located or retrieved by dectecting a signal mark disposed in a side edge portion of each frame of the microfilm. For example, as shown in FIGS. 1 and 2, one substantially square, relatively large-sized and black-colored signal mark 2 is disposed in each of the side edge portions $B_1$, $B_2$, $B_3$, . . . $B_n$ respectively corresponding to frames $A_1$, $A_2$, $A_3$, . . . $A_n$ of a roll microfilm 1, and the roll microfilm is advanced between a photosensitive element 3 and an illumination light source 4 which is disposed oppsite to the photosensitive element 3 so that a number of frames of the roll microfilm may be counted, thereby enabling the retrieval of a described frame. The dimensions of a conventional 35 mm roll microfilm which has been used in conjunction with the conventional roll microfilm retrieving method as described above are such that each frame is 39mm × 28mm with the center of the frame being along the longitudinal central axis of the roll film; the width of the edge portion is 3.5mm; and the signal mark is a square of 2.5mm × 2.5mm with the center being located along the transverse central line of the frame.

The reasons why relatively large-sized signal marks have in the past been provided on roll microfilm are that (1) erratic actuation of photosensitive elements due to dust particles or the like attached to the microfilm can be prevented and (2) the sensitivity of the photosensitive element used in the conventional device of the type described is not sufficient. Such large-sized signal marks as described above inevitably require a broader width of the side edge portion so that the frame size is limited to a smaller size. Consequently, reductions are generally limited to small reductions in order to prevent a decrease of the resolution power of a negative or positive picture, depending upon the information to be recorded, and at the same time the magnification or enlargement must be reduced for the same reason as described above. Therefore, the conventional roll microfilm making technique, as described above, is not satisfactory to meet the ever-increasing demand in the information field for recording more complex, wider and more information in a minimum number of frames in order to facilitate information storage and retrieval.

The present invention therefore has for its object the provision of an improved roll microfilm wherein a plurality of small signal marks disposed in predetermined spaced-apart relation with respect to each other in the margin portion of each frame of the roll microfilm are detected by the same number of photosensitive elements so as to detect a number of frames.

According to one preferred embodiment of the present invention, a plurality of relatively small-sized signal marks are disposed in a predetermined relationship in a side edge portion of each of the frames of a roll microfilm. When roll microfilm having signal marks as described above is advanced through a signal mark detecting device, these signal marks can be detected by means of a plurality of detecting elements which are disposed in the same relationship with that of said signal marks. The retrieval of a desired frame can be effected by counting the number of detections of such signal marks. Photoelectric transducer elements are generally used as detecting elements in such a manner that they detect the light transmitted through the roll microfilm from a light source disposed behind the roll microfilm in opposition to the detecting elements so as to detect whether the transmitted lights are incident thereupon or not. Alternatively, the detecting elements of the type described may be so arranged and disposed in such a manner they detect the intensity of the light which is radiated from a light source disposed on the same side of the detecting elements toward the roll microfilm and are reflected thereby. According to the aspect of the present invention, when detection of the transmitted light is employed, a light source is disposed in and held stationary with respect to a transparent hollow drum together with a reflecting mirror. The roll microfilm to be retrieved is advanced over the transparent hollow drum by means of suitable guides and the signal marks are detected by the detecting elements.

One of the objects of the present invention is therefore to utilize insofar as possible only a limited area of a roll microfilm for recording information.

Other objects and advantages of the present invention will be apparent from the following description of a preferred embodiment thereof, taken in conjunction with the accompanying drawing, wherein.

Figure 1:
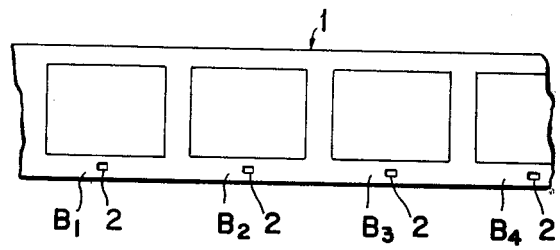
FIG. 1 is a plan view illustrating a portion of a roll microfilm having conventional signal marks for retrieval.
Figure 2:
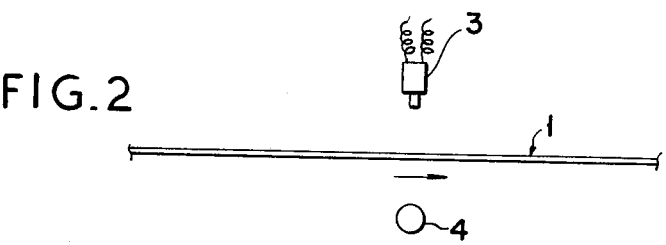
FIG. 2 is an explanatory view illustrating a signal mark detecting portion of a conventional roll microfilm retrieving device.

As above discussed, in the past limitations have been placed upon the minumum size of markings in the margins of the frames of roll microfilm in order to avoid erratic operation of sensing means for detecting the markings. Thus, dust particles frequently fall on the roll microfilm when it is in use, and the opaqueness of such dust particles may simulate the optical effect of the markings if the dust particles fall on the portions of the microfilm wherein the markings would normally be placed. In order to overcome this problem, in the past, as illustrated in FIG. 1, the markings have been formed with a sufficiently large size, for example about 2.5 mm across, that ordinarily existing dust particles would not produce the same optical effect as the markings. Further, it was necessary that the sensitivity of the system be decreased to such a degree that the dust particles would not effect erratic operation of the detecting system. In addition, due to the minimum size limitations placed on the markings, it was necessary to dimension the information carrying portions of the frame so tht an adequate edge portion or margin was available for the markings.

It is the concept of the present invention that an advantageous marking arrangement may be provided for the frames of a roll microfilm by reducing the size of the markings as much as possible, i.e., to the minimum detecting limits of detecting systems, without introducing problems of erratic operation due to the presence of dust particles of similar size, by providing at least three markings in the margins or edge portions of each frame, the markings in each frame having disparate spacing in the longitudinal direction of the roll microfilm. Thus, the markings are spaced in such a manner that it would be unlikely that three or more dust particles would fall on the film in the same geometrical relationship to simulate the grouping of the markings. Consequently, in the system in accordance with the invention it is not necessary to limit the sensitivity of the detection system in order to avoid operation of any given sensing element by a dust particle, and the markings may consequently have sizes of the same general dimension of a dust particle. In addition, since the size of the markings can be substantially reduced, the widths of the frame portions of the microfilm can also be reduced, to enable a larger portion of the film to be employed for information or data. It is preferred, for example, in accordance with the invention, that the markings have diameters in the range of about 0.5mm to 1 mm.

Figure 3:
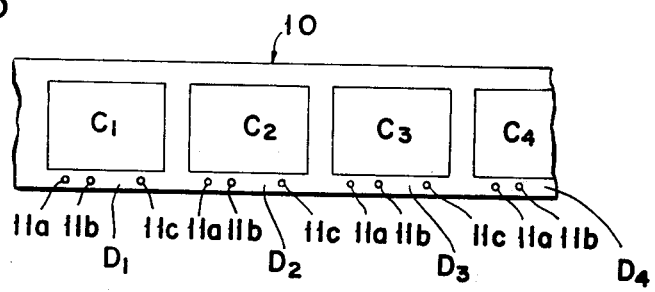
FIG. 3 is a plan view of a portion of a roll microfilm having signal marks according to one embodiment of the present invention.
Figure 4:
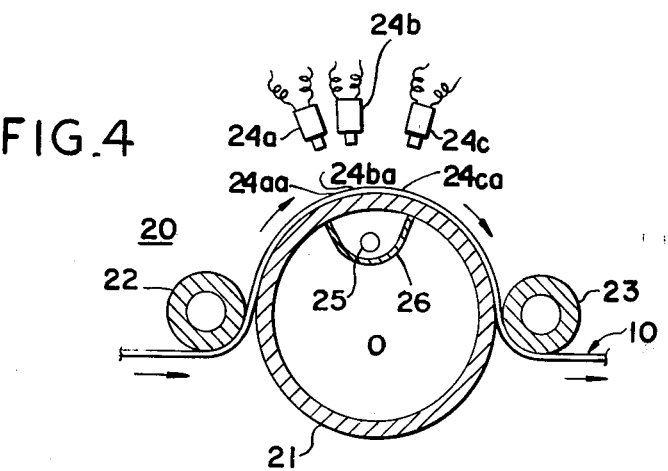
FIG. 4 is an explanatory view illustrating one embodiment of the construction of the signal mark detecting portion for retrieval of the roll microfilm shown in FIG. 3.

Referring now to FIGS. 3 and 4, a group of small round black-colored signal marks $11a$, $11b$ and $11c$ are photographed, developed and fixed together with picture frames in each of edge portions $D_1$, $D_2$, $D_3$, ... $D_n$ corresponding to frames $C_1$, $C_2$, $C_3$, ... $C_n$. The dimensions of the small signal marks may be reduced as far as a conventional highly sensitive photosensitive element can detect the small signal mark. For example, in case of a 35mm roll film, it has been found that the diameter of the signal marks may be reduced to the range of about 0.5mm to 1.0mm. Therefore, the width of the edge portion which had previously been limited to a minimum of 3.5mm, may be conveniently reduced to 1.5mm to 2.0mm so that the width of each frame can be accordingly enlarged by a distance corresponding to the reduced width of the side edge portion, whereby higher resolution power and the retrieval accuracy may be attained in copying and printing. Since three small signal marks $11a$, $11b$ and $11c$ are spaced equidistantly from the side edge of the film with marks $11a$ and $11b$ closer together than marks $11b$ and $11c$, it will hardly happen that the dust particles and the like having the same diameter as that of the small signal marks will become aligned in the same order as the signal marks. Consequently erratic actuation of the retrieving photosensitive element by the dust particles or the like can be completely prevented.

A retrieving device generally indicated by reference numeral 20 includes a hollow drum 21 made of a suitable transparent material and guide rollers 22 and 23 rotatably carried by suitable shafts respectively. A roll microfilm 10 is wrapped around a lower periphery of the guide roll 22, over the upper periphery of the drum 21 and around the lower periphery of the guide roller 23, and thereafter advanced to the next stage. When the hollow drum 21 is rotated in the direction indicated by the arrow by a suitable prime mover (not shown), then the roll microfilm 10 advances as indicated by the arrows. Photosensitive elements $24a$, $24b$ and $24c$ are provided disposed upwardly of the drum. These elements may be for example, photoelectric tubes arranged in such a manner that each vertical axis of the photosensitive elements intersects the center of the drum 21. Furthermore, the axes of the photosensitive elements are arranged in such a manner that the intersections $24aa$, $24ba$ and $24ca$ at which the axes of the photosensitive elements intersect the microfilm 10 correspond or coincide with the positions of said small signal marks $11a$, $11b$ and $11c$ respectively. As shown in FIG. 4, a light source 25 and a reflecting mirror 26 are disposed within the drum 21 so that the edge portions $D_1$, $D_2$, $D_3$, ... $D_n$ of the roll microfilm 10 are illuminated as the microfilm 10 is advanced.

As clearly shown in FIG. 3, each group of signal marks $11a$, $11b$, and $11c$ for each frame have a definite relationship of spacing which is repeated exactly for every other frame. For example, the spacing between the marks $11a$ and $11b$ is less than the spacing between marks $11b$ and $11c$. This disparity of the spacings or distances is critical to the invention to provide for precise alignment with the axes of the photoelectric elements and avoid any possible actuation by dust particles or the like which would not achieve such predetermined spacing. With respect to these photoelectric elements, the same disparate spacing is therefore necessary, and this is clearly seen in FIG. 4 where the distance between elements $24a$ and $24b$ is less than the distance between elements $24b$ and $24c$. It will be understood from a consideration of FIG. 4 that the individual disparate spacing between the photoelectric elements would be greater than the individual disparate spacing between the marks since the photoelectric elements are located on an arc outside of drum 21 on which the microfilm is advanced. However, such individual disparate spacing of the two distances between the photoelectric elements bears the same ratio as the individual disparate spacing of the two distances between the marks so that when the axes of the photoelectric elements intersect the microfilm, an exact alignment with the small-size marks in each group is assured.

With the construction described hereinabove, when the roll microfilm 10 is advanced over the signal sensing portions in the direction indicated by the arrows, each of small signal mark groups each consisting of three small signal marks $11a$, $11b$ and $11c$ are simultaneously sensed by means of the photosensitive elements $24a$, $24b$ and $24c$ so that the roll microfilm 10 is stopped at a predetermined frame thereof after the roll film has been advanced by a predetermined number of frames.

Figure 5:
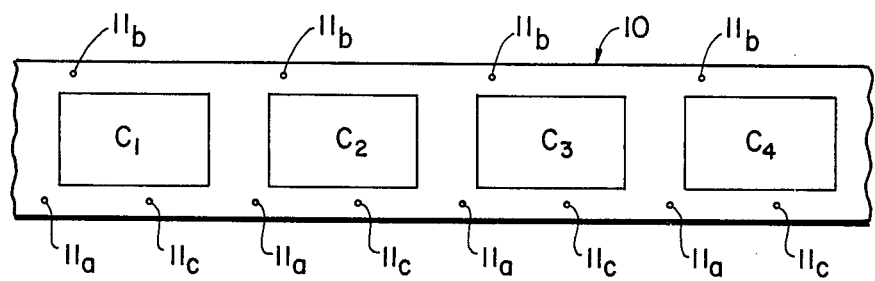
FIG. 5 is a plan view of a portion of a roll microfilm having signal marks according to another embodiment of the invention.

In the embodiment of the invention illustrated in FIG. 3, the marks are illustrated as lying on a common line extending in the lengthwise direction of the roll microfilm. In addition to dust particles, as above discussed, other factors occasionally arise that may interfere with the marks on the film thereby giving rise to erroneous indications. For example, scratches may appear on the film, and such scratches frequently extend in the lengthwise direction of the film. Such orientation of the scratches result, for example, from the fact that this is the direction of movement of the film during winding or unwinding from a spool. Since such scratches are oriented in the same direction as the marks as shown in FIG. 3, it is of course possible that a scratch may occur along the same line as the marks, and hence result in erroneous indication. In order to overcome this problem, the marks may be placed on different longitudinally extending loci on the roll microfilm, as illustrated in FIG. 5. In this arrangement the marks 11a and 11c are provided in the border of each frame which extends along one side of the roll microfilm, and the mark 11b is provided in the border extended along the opposite side of the roll microfilm. In this arrangement with respect to the lengthwise direction of a roll microfilm, the mark 11b is intermediate the marks 11a and 11c, being closer to the mark 11a than to the mark 11c. The geometric arrangement of the marks, and the spacings of the marks with respect to the frames, is invariable throughout the lengthwise dimension of a roll microfilm. In the arrangement of FIG. 5 it is apparent that a longitudinally extending scratch may provide an optical effect simulating the inline marks 11a and 11c, but it is unlikely that simultaneously a scratch or a dust particle, or the like will occur on the film so that the entire geometric arrangement of the marks is simulated.

Figure 6:
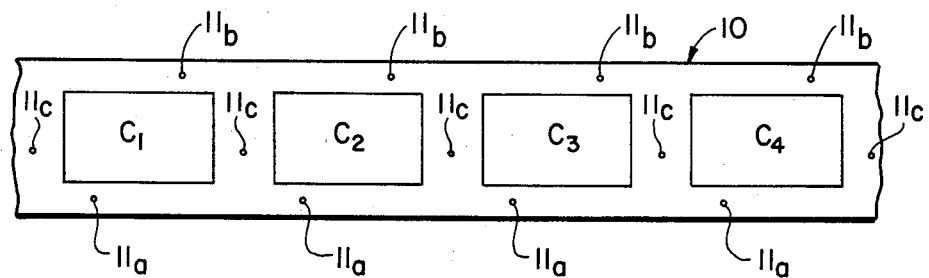
FIG. 6 is a plan view of a portion of a roll microfilm having signal marks according to a further embodiment of the invention.

In a further embodiment of the invention, as illustrated in FIG. 6, all three of the marks are provided in different loci with respect to the longitudinal direction of the film. Thus, the marks 11a are provided in the border adjacent one edge of the film, the marks 11b are provided in the border of each frame adjacent the opposite side of the film, and the marks 11c are provided in the border of each frame in the region between the adjacent frames. As in the previously described arrangements, the mark 11b is intermediately marks 11a and 11b with respect to the lengthwise direction of the film. The mark 11c is intermediately marks 11a and 11b with respect to the transverse dimension of the film. The transverse dimension between the mark 11c and the mark 11a may be equal to the transverse dimension between the mark 11c and the mark 11b, although preferably these dimensions are different to reduce the possibility of errors. In the arrangement of FIG. 6, it is extremely unlikely that a combination of scratches and/or dust particles could occur on the film that would simulate the geometric pattern of the marks in each frame. As in the previously described arrangements, the geometric pattern in each frame is invariable throughout the length of the film.

The invention has been thus far described as utilizing three black-colored small round signal marks 11a–11c as the small signal marks, but it will be understood that the shape and the number of the small signal marks are not limited to a round shape or three marks respectively. For example, the marks may be rectangular or polygonal in shape, and more than three marks may be employed. In order to avoid erroneous indication, however, it is preferred that no other marks be be provided in the borders of the frames, at least in the longitudinally extended loci of the marks in the geometric pattern employed. With respect to the sizes of the marks, it is preferred that their dimensions be in the range 0.5 mm to 1.0 mm both in the direction transversely of the film and in the longitudinally extending direction of the film. Such a size enable maximum utilization of the film for data or information purposes, as above discussed, while avoiding the necessity of controlling the detection sensitivity to avoid erroneous indication due to dust particles as in the arrangements of the prior art.

It must also be understood that the color of the small signal marks is not limited to deep black, but it may be such that the contrast of the color can be distinguished from that of the edge portion that forms the mechanical base of the film.

What is claimed is:

1. A roll microfilm having a series of picture frames each having a border therearound for use with a microfilm retrieving device of the type having a light source and a plurality of detecting elements, comprising a group of at least three small size marks having optical detection characteristics which may be simulated by dust particles lying on the microfilm, said marks being located within the border of each frame, spacings on either side of an intermediate mark in the lengthwise direction of the microfilm being disparate and corresponding in number and alignment with said detecting elements, whereby erratic activation of said detecting elements by dust particles on said microfilm is inhibited, the relative positions of said marks being invariable in each frame of said roll microfilm, each said group of marks including three small size round marks with each of said round marks having a diameter of about 0.5 to 1.0 millimeters, the border of said picture frames having a dimension of about 1.5 millimeters to 2.0 millimeters.

2. A roll microfilm having a series of picture frames each having a border extending to an edge of said microfilm, and a group of first and second small optically detectable marks and a third small optically detectable mark intermediate said first and second marks with respect to the lengthwise direction of said microfilm and located within the border of each of said frames, said marks having diameters from 0.5 to 1.0 mm whereby the optically detectable characteristics of said marks may be simulated by the optical characteristics of dust particles which may accidentally come to rest on said microfilm, the spacing between said first and third marks being different than the spacing between said second and third marks in the lengthwise direction of said film, the relative positions of the marks of each frame with respect to each other and with respect to the respective frames being invariable throughout the length of said roll microfilm, whereby the probability of groupings of dust particles on the film duplicating the grouping of said marks is minimized.

3. The roll microfilm of claim 2 wherein the marks of said group have dimensions of 0.5 – 1 mm in the longitudinal and transverse directions of said microfilm, the marks of said group in each frame being the only marks in the border of each frame longitudinally aligned with respect to said first, second and third marks.

4. The roll microfilm of claim 2 wherein said marks are longitudinally aligned in said border adjacent one side of said microfilm.

5. The roll microfilm of claim 2 wherein at least one of said marks is displaced from another of said marks in a direction transverse of said microfilm.

6. The roll microfilm of claim 5 wherein said first mark is in a border of a frame adjacent one edge of said microfilm and said second mark is in a border of said frame adjacent to the opposite edge of said roll microfilm.

7. The roll microfilm of claim 6 wherein said third mark is in a border of said frame between adjacent frames.

8. The roll microfilm of claim 2 wherein one of said marks is positioned in a border of the respective frame adjacent one edge of said microfilm, another of said marks of each frame is in the border of the respective frame adjacent the opposite edge of said microfilm, and the marks of said group in each frame constitutes the only marks in the border of the respective frame in longitudinal alignment with any of said first, second and third marks.

9. The roll microfilm of claim 2, wherein said roll microfilm is 35 mm. microfilm, and the borders of said frames between the edges of said frames and the edges of said microfilm are from 1.5 mm to 2.0 mm. in width.

* * * * *